(12) United States Patent
Tsuruga et al.

(10) Patent No.: US 7,765,578 B2
(45) Date of Patent: Jul. 27, 2010

(54) DIGITAL BROADCAST RECEIVING DEVICE AND METHOD

(75) Inventors: Sadao Tsuruga, Yokohama (JP); Takatoshi Shirosugi, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 1094 days.

(21) Appl. No.: 11/063,738

(22) Filed: Feb. 24, 2005

(65) Prior Publication Data

US 2005/0246749 A1 Nov. 3, 2005

(30) Foreign Application Priority Data

Apr. 20, 2004 (JP) .............................. 2004-123631

(51) Int. Cl.
*H04N 7/16* (2006.01)
*H04H 40/00* (2008.01)
*H04N 5/91* (2006.01)

(52) U.S. Cl. .................... 725/142; 455/3.06; 386/46

(58) Field of Classification Search .................. 725/62, 725/68, 69, 75, 85, 109, 112, 131–139, 151; 370/310, 328–333; 455/135, 3.06; 702/69; 386/1, 45, 46, 125, 126

See application file for complete search history.

(56) References Cited

U.S. PATENT DOCUMENTS

| | | | |
|---|---|---|---|
| 5,666,293 A * | 9/1997 | Metz et al. ................... | 725/138 |
| 6,011,868 A | 1/2000 | van den Branden et al. | |
| 6,654,544 B1 * | 11/2003 | Suzuki et al. ................ | 386/124 |
| 2002/0056102 A1 * | 5/2002 | Dillon et al. .................. | 725/39 |
| 2002/0166128 A1 * | 11/2002 | Ikeda et al. .................. | 725/109 |
| 2003/0174673 A1 * | 9/2003 | Tomobe et al. .............. | 370/329 |

FOREIGN PATENT DOCUMENTS

| JP | 2000-165766 | 6/2000 |
|---|---|---|
| JP | 2001-078180 | 3/2001 |
| JP | 2002-044608 | 2/2002 |
| JP | 2003-9085 | 1/2003 |

(Continued)

OTHER PUBLICATIONS

ARIB TR-B14; Operational Guidelines for Digital Terrestaial Television Broadcasting; 1.5 Edition; pp. 26 and 7-33.

(Continued)

*Primary Examiner*—Scott Beliveau
*Assistant Examiner*—Michael Telan
(74) *Attorney, Agent, or Firm*—McDermott Will & Emery LLP (57) ABSTRACT

This invention relates to a digital broadcast receiver device capable of performing excellent reproduction equivalent to recording sessions in the case of receiving digital broadcast by handheld terminals or mobile/movable bodies, such as land vehicles, and then recording it in a storage device for reproduction. For example, when recording hierarchically transmitted digital broadcast on a recording medium, the reception quality is analyzed by a reception quality analyzer based on the information from a transmission path demodulator. A list generator generates a reception quality list from an analysis result from the reception quality analyzer and time information from a writing unit and then records it on the record medium. Upon playback from the record medium, the reception quality list is analyzed by a list analyzer. A selection instruction unit selects the optimum hierarchical service and then performs playback and display.

8 Claims, 10 Drawing Sheets

FOREIGN PATENT DOCUMENTS

| | | |
|---|---|---|
| JP | 2003-143503 | 5/2003 |
| JP | 2004-7163 | 1/2004 |
| JP | 2004-320762 | 11/2004 |

OTHER PUBLICATIONS

Chinese Office Action issued in corresponding Chinese Patent Application No. 2005100088460, dated Mar. 16, 2007.

Japanese Office Action issued in Japanese Patent Application No. JP 2004-123631 dated on Sep. 2, 2008.

European Search Report issued in European Patent Application No. 05251122.7, dated on Dec. 20, 2007.

* cited by examiner

| STC COUNT # | TRANSFER BYTE # | DATA FORM |
|---|---|---|
| 123456519 | 0 | SEQUENCE HEADER |
| 123456789 | 30 | GOP |
| 123501519 | 5000 | SEQUENCE HEADER |
| 123501789 | 5030 | GOP |
| ⋮ | ⋮ | ⋮ |
| ⋮ | ⋮ | ⋮ |
| ⋮ | ⋮ | ⋮ |

FIG. 3

| STC COUNT # | RECEPTION QUALITY | HIERARCHY # |
|---|---|---|
| 123456519 | 0 | 2 |
| 177456519 | 1 | 2 |
| 258456519 | 2 | 2 |
| ⋮ | ⋮ | ⋮ |
| ⋮ | ⋮ | ⋮ |
| ⋮ | ⋮ | ⋮ |

| | DATE/TIME | START | LENGTH | CHANNEL | MODE | PROGRAM TITLE |
|---|---|---|---|---|---|---|
| ×× | 12/12(SUN) | PM 3:30 | 2h30m | 011 | TS | WINTER SUMO TOURNAMENT |
| | 12/12(SUN) | PM 1:30 | 1h00m | 011 | TS | CINEMA "△△△" |
| | 12/12(SUN) | AM 9:30 | 1h30m | 051 | TS | DRAMA "△△" |
| | 12/12(SUN) | AM 7:30 | 1h00m | 011 | TS | NEWS |
| | 12/11(SAT) | PM 10:30 | 1h00m | 041 | TS | NEWS |
| | 12/11(SAT) | PM 8:30 | 1h30m | 081 | TS | CINEMA "○○○" |
| | 12/11(SAT) | PM 3:30 | 1h00m | 041 | TS | DRAMA "××" |
| | 12/10(FRI) | PM 11:30 | 1h00m | 081 | TS | CINEMA "×××" |
| × | 12/10(FRI) | AM 6:30 | 1h00m | 061 | TS | NEWS |
| | 12/10(FRI) | AM 4:30 | 1h00m | 071 | TS | DRAMA "○○" |
| | 12/9(THU) | PM 8:30 | 1h30m | 051 | TS | NEWS |

34 35

DIGITAL BROADCAST RECEIVING DEVICE AND METHOD

INCORPORATION BY REFERENCE

The present application claims priority from Japanese application JP2004-123631 filed on 20 Apr., 2004, the content of which is hereby incorporated by reference into this application.

BACKGROUND OF THE INVENTION

The present invention relates generally to digital broadcast receiving devices capable of recording and reproducing broadcast programs.

In recent years, television (TV) broadcasting is promoted to shift from analog to digital schemes in countries around the world. In Japan also, communications satellite (CS) and broadcasting satellite (BS) broadcast services relying upon digital technologies have already commenced; in addition, digital terrestrial broadcasting services have also started in selected areas.

A feature of the domestic digital terrestrial broadcast in Japan is that the orthogonal frequency division multiplex (OFDM) technique is used as its transmission scheme to thereby enable achievement of not only fixed reception but also mobile/cellular reception, while offering the capability to establish hierarchical transmission up to three graded classes or "layers" in maximum. With the use of such hierarchized transmission, it becomes possible to provide broadcast services with mutual synchronization between mobile reception-directed broadcast (strong hierarchical layer) and fixed reception-aimed broadcast (weak layer). An example thereof is disclosed, for example, in ARIB-TR14 Version 1.5, OPERATIONAL GUIDELINES FOR DIGITAL TERRESTRIAL TELEVISION BROADCASTING Section 7, Digital Terrestrial Television Broadcast Delivery Handling Rules," (Oct. 16, 2003).

Techniques for receiving the broadcast that uses such the hierarchical transmission are known, one of which is disclosed for example in JP-A-2000-165766 (page 5, FIG. 1).

Additionally, in the background of cost reduction and storage capacity increase of hard disk drive (HDD) units, there is known a technique for using a digital broadcast receiver with built-in HDD to record and reproduce digital broadcast contents directly in the format of MPEG2-TS, which stands for "moving pictures experts group phase two, transport stream." For detail, see JP-A-2003-9085 (page 17, FIG. 1).

SUMMARY OF THE INVENTION

Unfortunately, prior known digital broadcast receivers with built-in HDDs suffer from problems which follow. Typically, the HDD-embedded digital broadcast receivers are such that when digital broadcast is being received by a handheld terminal or a mobile/movable body such as a land vehicle or the like, the reception quality can decrease resulting in occurrence of errors in a received stream, although digital terrestrial broadcast is designed to employ specific schemes and techniques that take account of mobile/movable-body reception, such as the OFDM (Orthogonal Frequency Division Multiplizing) technology and frequency/time interleave techniques. This in turn causes the digital broadcast reception by means of mobile/movable bodies to experience an appreciable variation in reception quality due to any possible phasing, multi-path, or carrier-to-noise (C/N) deterioration or else. Once the reception quality significantly deteriorates, error correction becomes impossible, resulting in errors taking place in the received stream.

In this way, in the case of receiving the broadcast using the hierarchical transmission in the state that the reception quality is greatly reduced, it is possible to provide good reception by changing or switching from a weak hierarchical class or "layer" to a strong layer. An approach to determining the timing for performing such switching operation is disclosed, for example, in JP-A-2000-165766 (page 5, FIG. 1), which teaches that the reception quality of an input signal is judged by detection of a with-time variation amount of the input signal characteristics at a front end unit, such as an electric field strength, carrier-to-noise (C/N) value or bit error rate (BER), followed by an attempt to switch to an optimal reception hierarchy layer. With this approach, it is possible, in the case of receiving hierarchically transmitted digital terrestrial broadcast via handheld terminals or mobile/movable bodies such as auto cars or else, to play back and display video images and audio/voice sounds with excellent reception quality.

However, the above-noted conventional receivers are faced with a problem which follows. When recording a received stream to an HDD and reproducing the same, any successful playback and visual display are no longer possible because of the following fact: for example, in order to record streams of a weak hierarchical layer and of a strong layer simultaneously and then reproduce this stream, the timing for switching between hierarchical layers in the state that the reception quality during recording is extremely deteriorated is kept unknown.

This is resulted from the fact that as has been explained above, the traditional receivers are merely designed so that the hierarchy switch timing is determined by utilization of the detection result of a with-time variation amount of the input signal characteristics at the front end unit. More specifically, the input signal characteristics have been detected through measurement of the electric field strength, C/N value or BER of an input signal at the front end unit. On the contrary, the stream to be recorded to HDD is an output of the front end unit—practically, an MPEG-TS stream. By reproducing this stream, it is impossible to measure the electric field strength, C/N value or BER in the way of the prior art. This results in the hierarchy switch timing becoming unknown, which leads to the lack of an ability to perform successful playback and display operations.

The present invention has been made in view of such the circumstances, and relates to providing a digital broadcast receiving device capable of performing reproduction equivalent in quality to that during recording sessions in the case of receiving digital broadcast by handheld terminals or mobile/movable bodies such as land vehicles and recording it to a storage device(s) and then reproducing the same.

To attain the foregoing object, an arrangement is employed which comprises a reception means for receiving and demodulating a digital broadcast signal being transmitted while dividing more than two image signals or audio signals into different hierarchical classes or layers within the same transmission channel, an analysis means for analyzing the digital broadcast signal received at the reception means, and a record/reproduction means for recording in the form of a data stream the image signals or audio signals as received at the reception means and for reproducing the same. The record/reproduction means is operable, based on information concerning the reception quality that was analyzed at the analysis means and management information correlated with the data stream recorded to the recording means, to reproduce an image or audio signal of the image or audio signals being divided into a plurality of hierarchical classes and being included in the recorded data stream, wherein the image or audio signal is at either one of the hierarchical layers.

According to this invention, in the digital broadcast receiver device, it becomes possible to achieve excellent reproduction of recorded television programs.

Other objects, features and advantages of the invention will become apparent from the following description of the embodiments of the invention taken in conjunction with the accompanying drawings.

DETAILED DESCRIPTION OF THE EMBODIMENTS

Currently preferred embodiments of the present invention will be explained in detail with reference to the accompanying drawings below. Although this invention is related in particular to a recorder-embedded digital broadcast receiving device for use with mobile/movable bodies while enabling recording of broadcast programs by handheld terminals or mobile/movable bodies such as land vehicles, the invention should not exclusively be limited to such equipment for the mobile and in-vehicle use and recorder-embedded digital broadcast receiver devices and may also be applied to other digital broadcast receiver devices of the stationary type and those with no built-in recorders.

In the explanation below, the term "hierarchical transmission" is used to mean certain cases where more than two image and/or audio Elementary Streams (ES) are being transmitted within the same transmission channel while allowing each ES to be sent with a different transmission path coding/modulation processing applied thereto.

Embodiment 1

Figure 1:
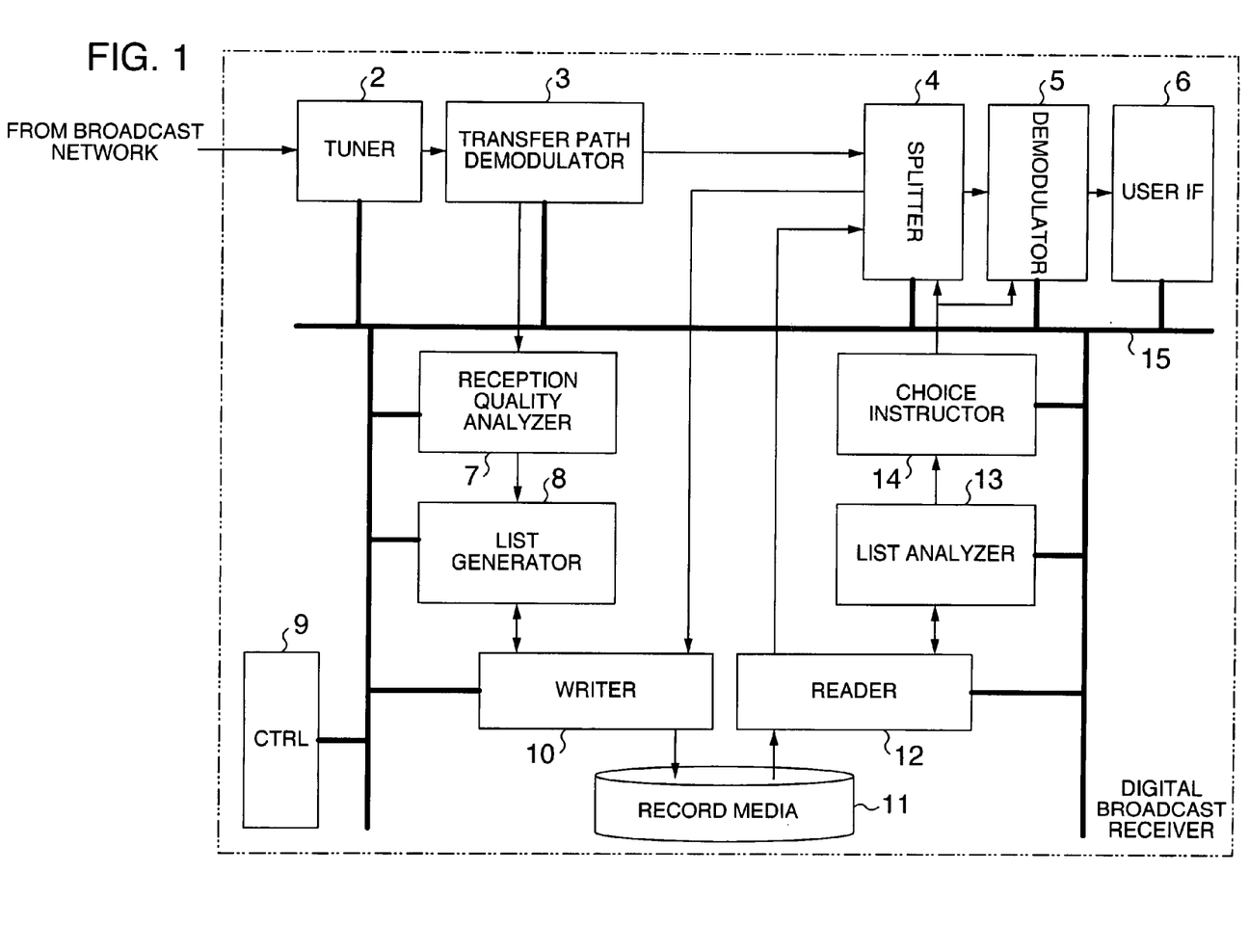
FIG. 1 is a block diagram showing a configuration of a storage device-embedded digital broadcast receiver device.

FIG. 1 is a block diagram showing an exemplary configuration of a digital broadcast receiving device having a built-in storage output device in accordance with a first embodiment of the invention is applied.

In FIG. 1, the digital broadcast receiver device 1 includes a tuner 2, a transmission path demodulation unit 3, a separation unit (for example, demultiplexer) 4, a reception quality analysis unit 7, a list generation unit 8, a writing unit 10, a recording medium (e.g., a hard disk or a memory or an optical disk) 11, a readout unit 12, a list analysis unit 13, a selection instruction unit 14, a control unit (e.g., central processing unit or "CPU") 9, and a system bus unit 15. The digital broadcast receiver 1 also includes a demodulation unit (e.g., an MPEG decoder) 5 and a user interface unit 6 (for example, a key board or mouse or remote commander for use as an input device, a display device using a cathode ray tube (CRT) or liquid crystal display (LCD) or plasma display panel (PDP) for use as an output device, and a speaker device).

The tuner 1 receives a digital broadcast signal via broadcast transmission networks such as satellite or ground or cable links from a digital broadcasting source from a broadcast station (not shown), and then applies tuning and demodulation processing to the frequency of a channel that was designated via a user operation unit such as a remote commander of the user interface unit 6 and the control unit 9, and thereafter outputs it to the transmission path demodulator unit 3.

The transmission path demodulator 3 outputs to the separator unit 4 the resultant MPEG2-TS obtained after execution of the digital demodulation and error correction processing with respect to the signal from the tuner 1, which has been applied the tuning and demodulation processing. On the other hand, the transmission path demodulator 3 outputs to the reception quality analyzer unit 7 both the hierarchy number information at the time of hierarchical transmission and the information concerning the electric field strength, carrier-to-noise (C/N) value, bit error rate (BER) or error indicator data of a received stream during the digital demodulation and error correction operations.

While the digital broadcast employs for information distribution a transport stream which is standardized by a MPEG system, the transport stream is made up of transport packets each having a fixed length of 188 bytes. The transport packet is arranged so that the initial 1 byte is a synchronization byte and the next 1 byte indicates an error indicator (error indication). This indicates whether an error is present or absent in the packet. If a non-correctable error is found during the error correction processing, then the error indicator is set to "1" at the transmission path demodulator 3 (if no errors are found then set at "0"). The error indicator information refers to the information of the above-noted error indicator.

The reception quality analyzer 7 determines or "judges" the reception quality based on the hierarchy number information from the transmission path demodulator 3 and the electric field strength, C/N value, BER or error indicator information, and then outputs such information to the list generator 8.

The separator unit 4 separates or splits from the input MPEG2-TS a plurality of transport packets of the channel that was designated via the user operation unit of the user interface 6, such as a remote commander, and the control unit 9 and then outputs the separated multiple transport packets to the writing unit 10 while extracting a Packetized Elementary Stream (PES) or Elementary Stream (ES) from plural transport packets of the channel that was designated via the user operation unit of the user interface 6 such as the remote commander and the control unit 9 to thereby output it to the demodulator unit 5.

The demodulator 5 demodulates the PES or ES of a video image and/or audio from the separator 4, causing the image and/or audio thus demodulated to be output to the user interface unit 6. The user interface 6 visually displays and/or reproduces the demodulated image and/or audio at the display device and/or the speaker device, each of which is an output device.

The list generator 8 prepares a position information list based on the information from the writing unit 10 to be later described and also prepares a reception quality list based on the reception quality information from the reception quality analyzer 7 for output to the writing unit 10.

The writing unit 10 performs recording processing of the transport packets separated at the separator 4 onto the recording medium 11 and also outputs to the list generator 8 the information used for list preparation at the recording medium 11. In addition, the writing unit 10 records on the recording medium 11 the position information list generated at the list generator 8 along with the reception quality list.

The position information list is the information that indicates what kind of information is recorded on the recording medium 11 at what position thereof. Additionally, the information for list preparation is such that in case the writing unit 10 records those transport packets of image data on the record medium 11 by way of example, the list makeup information involves position information indicating, by means of a transfer byte number of the data from a sequence header being placed at the top at the time of recording startup, a position of the sequence header that is a group unit for execution of moving picture compression of video data and/or group of pictures (GOP) or intra (I) picture. The information also contains time information indicative of a system time clock (STC) count value at the time of recording each GOP and/or I picture.

Figure 2:
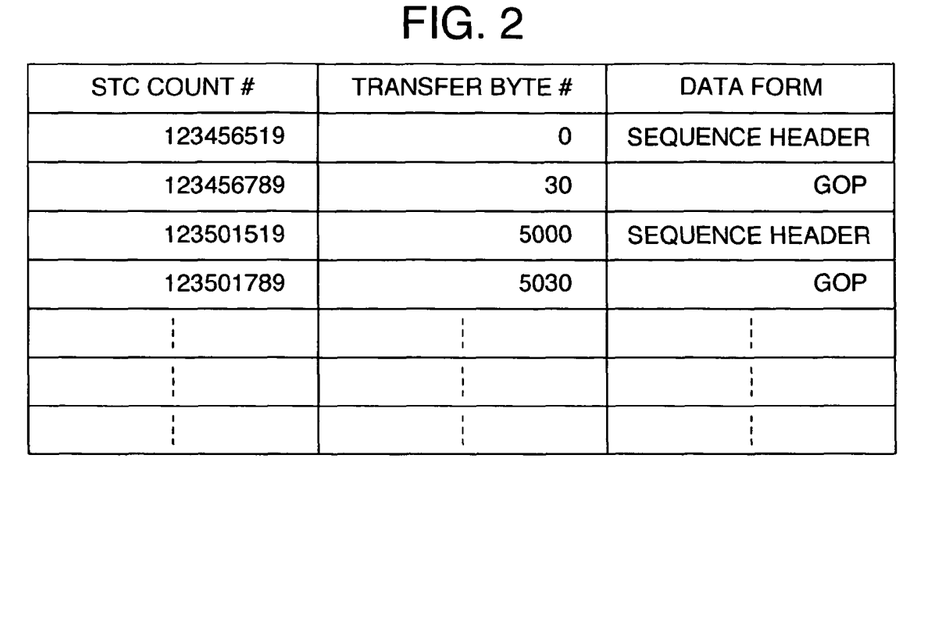
FIG. 2 is a diagram showing a practical example of the content of a position information list.

FIG. 2 shows a practical example of the position information list. Note here that the content of the position information list may be used to indicate the position information by a transferred transport packet number in place of the transfer byte number. Additionally, the time information may be indicated by either an immediately preceding sequence header or a difference value relative to the STC count number in the GOP and/or I picture.

It is permissible to add packet identifier (PID) information to the position information list. Whereby, it is possible to manage the position of every image data on the recording medium 11 even when recording on the recording medium 11 a transport stream with a plurality of image data multiplexed together for example. Thus it is possible to identify and distinguish any desired image data, which in turn makes it possible to effectively perform reproduction, such as special playback or else.

The reception quality list is a list which is prepared by use of information indicating a level at which the reception quality is set when recording a received digital broadcast signal on the recording medium 11, time information that is the information for preparation of the above-noted list from the writing unit 10, and a hierarchy number at the time of hierarchical transmission.

Figure 3:
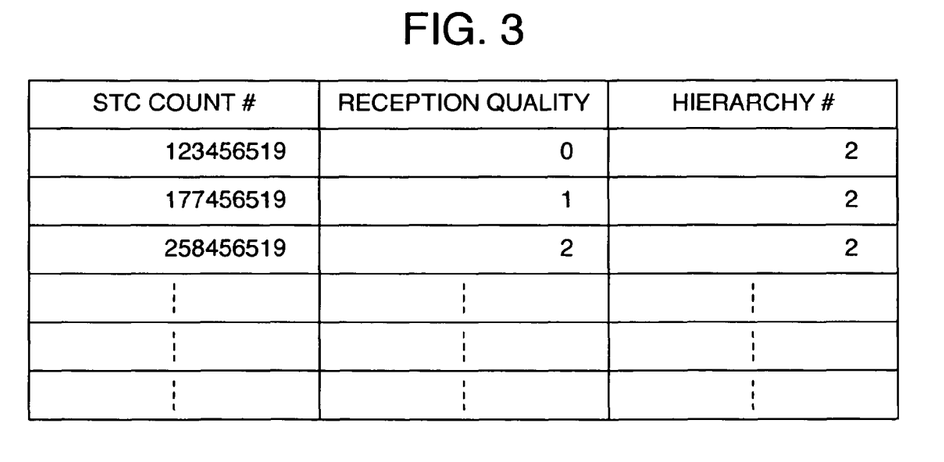
FIG. 3 is a diagram showing a practical example of the content of a reception quality list.

FIG. 3 shows a practical example of the reception quality list. Assuming for example that a digital broadcast signal being recorded is such that its hierarchy number is two (indicating the presence of a couple of graded classes or layers), the reception quality is judged using three levels of "0" weak hierarchical layer receivability, "1" strong layer receivability and "2" weak-and-strong layer non-receivability, and is then formulated into a list while being correlated with the time information.

The readout unit 12 first reads the position information list and the reception quality list out of the recording medium 11, and outputs them to the list analyzer unit 13.

The list analyzer 13 searches for the record location of a desired transport packet based on the position information list and causes the readout unit 12 to sequentially read desired transport packets out of the recording medium 11 and then controls the read transport packets to be output to the separator unit 4. By performing the readout processing using the position information list in this way, it is possible to conduct a search in units of compressed motion picture groups of the video image data. This makes it possible to perform special reproduction efficiently. In addition, it becomes possible to calculate, during normal playback and special playback sessions, a playback time period and a remaining playback time in the stream. Thus it becomes possible to notify a user of a present playback time and a time assumed to be taken up to the completion of a playback program. On the other hand, the list analyzer unit 13 analyzes the reception quality of the data being presently reproduced based on the reception quality list (i.e., data being read out of the recording medium 11) and then outputs its resulting reception quality information to the selection instruction unit 14.

The selection instructor unit 14 controls the separator 4 and/or the demodulator 5 based on the reception quality information from the list analyzer 13. For example, the selection instructor 14 controls the separator 4 and/or demodulator 5 in such a way as to separate and/or demodulate a transport packet that was transferred by a weak hierarchical layer in case the reception quality information from the list analyzer 13 is of the reception quality "0," or a transport packet as sent forth by a strong layer in case the reception quality stays at "1."

The control unit 9 executes various kinds of processing tasks by controlling an operation of the entirety of the digital broadcast receiver device 1 and also receiving various types of command signals from the user via the remote commander or else of the user interface unit 6 to thereby control, based such command signals, a block which is connected through the system bus unit 15.

Figure 4:
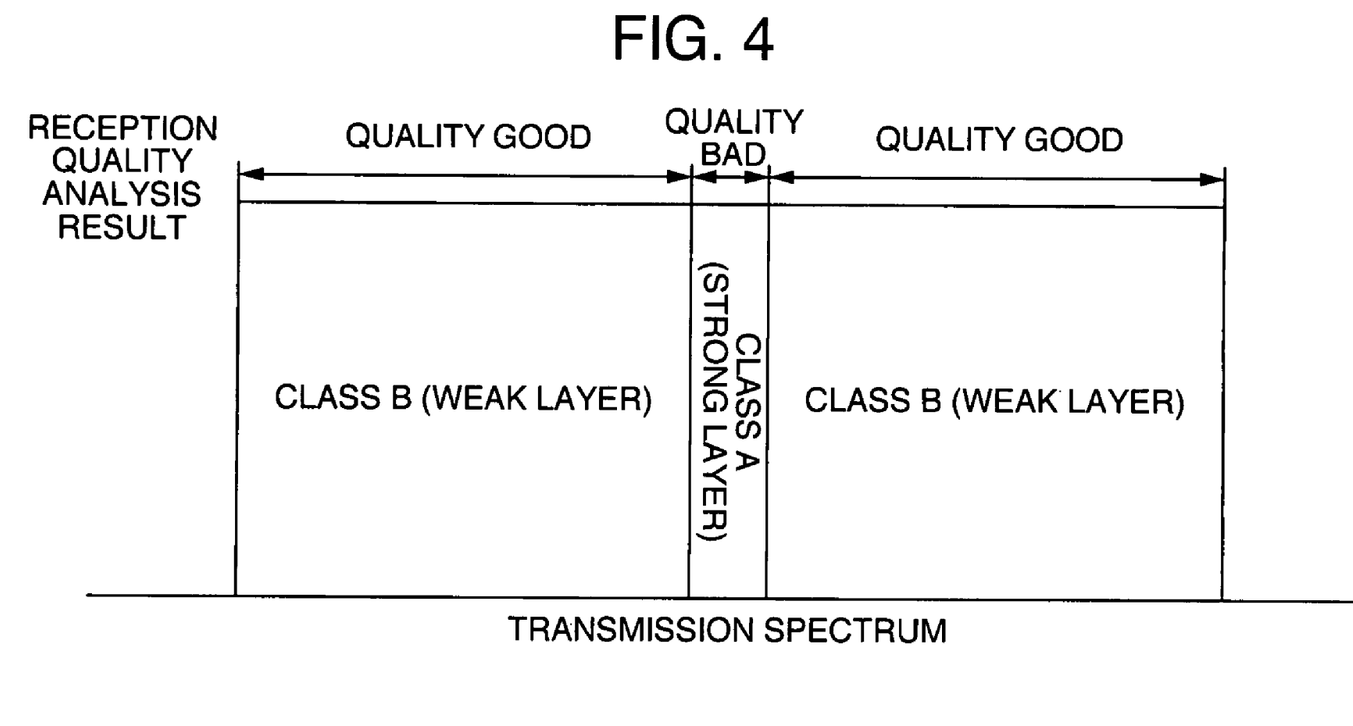
FIG. 4 is a diagram for explaining about hierarchical transmission.

Here, an explanation will be given of the hierarchical transmission with reference to FIG. 4. FIG. 4 shows a transmission spectrum of a certain broadcasting scheme—for example, the digital terrestrial broadcast system known as "Integrated Services Digital Broadcasting Terrestrial (ISDB-T)" of Japan—in case its hierarchy number is set at two layers (i.e., a stationary reception-directed layer plus mobile reception-directed layer). A hierarchical layer B is assigned to twelve segments, while a layer A is to one segment. For example, the layer B is designed to employ a modulation scheme of what is called the sixty-four quadrature amplitude modulation (64 QAM) with its internal code encoding ratio of 3/4, wherein a C/N value required is high but its transmission capacity also becomes greater, thereby enabling successful signal reception at the time of good reception quality. Regarding the hierarchical layer A, this uses a modulation scheme of the so-called quaternary phase shift keying (QPSK) technique with its internal code encoding ratio of 1/2, wherein the C/N value required is low but the transmission capacity also becomes less; thereby enabling signal reception not only in good reception quality events but also in bad reception quality events.

An explanation will next be given of a system routine of the reception quality list preparation processing to be performed by the list generator unit 8 with reference to a flow chart of FIG. 5.

Upon start-up of a television program recording session, the reception quality analyzer unit 7 acquires from the transmission path demodulator 3 the data indicative of a total hierarchy number of the hierarchical transmission (at step S1 of FIG. 5), electric field strength, C/N value, BER and error indicator information (at step S2). Thereafter, the reception quality analyzer 7 evaluates the reception quality from the electric field strength, C/N value, BER and error indicator information (step S3). An example is that in case the total hierarchy number is two and indicates the presence of a couple of graded classes or "layers" consisting of a weak layer and a strong layer, the analyzer evaluates the reception quality as "0" when the reception quality is good and the electric field strength, C/N value, BER and error indicator information ensure weak-layer signal receivability, such as in the state that a movable body remains stationary. Alternatively, the analyzer evaluates the reception quality as "1" when the movable body begins to move or when it remains stationary while the reception quality decreases due to a change in reception ambient environment resulting in the electric field strength, C/N value, BER and error indicator information permitting signal reception of the strong hierarchical layer although indicating that weal layer reception is difficult. Further, evaluate the reception quality as "2" when the electric field strength, C/N value, BER and error indicator information indicate the lack of any strong-layer signal receivability, such as inside of a tunnel or the like. Furthermore, the reception quality analyzer 7 acquires (at step S4 of FIG. 5) the time information indicative of a system time clock (STC) count number at the time of recording each GOP and/or I picture. The list generator 8 prepares a reception quality list based on every information of the total hierarchy number information from reception quality analyzer 7 along with the time information and reception quality information (step S5). Note that if no hierarchical transmission is done, then the total hierarchy number information becomes "1."

The processing stated above is executed until the program recording is terminated. Upon such termination, let the processing be completed (at step S6 in FIG. 5).

Next, an explanation will be given of a procedure for the reception quality analysis processing to be performed by the list analyzer unit 13, with reference to a flowchart of FIG. 6.

Prior to startup of this processing, the list analyzer 13 obtains from the readout unit 12 the position information list being recorded on the recording medium 11 while program playback gets started based on this list. Upon startup of the broadcast program playback, the list analyzer 13 acquires from the readout unit 12 a reception quality list being recorded on the record medium 11 (at step S7). The list analyzer 13 determines, based on the hierarchy number information of such reception quality list, whether the reception quality is less than or equal to N−1, where N is the total hierarchy number (at step S8). In case the reception quality is less than or equal to N−1, use the information within the position information list and the time information and reception quality information within the reception quality list to determine whether it is necessary or not to change the hierarchical layer from a presently reproduced layer and reception quality at a future time point from the present (step S9). If such the layer switching is necessary then use both the position information within the position information list and the information within the reception quality list to compare a present playback time with a layer switching time and then continue comparing until the switch time comes (step S11). When the switch time came, the selection instruction unit 14 controls the separator 4 and/or demodulator 5 and/or interface unit 6 for performing hierarchical layer selection and playback plus display (step S12).

On the other hand, in case the reception quality is N, this means that no playback is executable in all the hierarchical layers. If this is the case, in order to inform the user of the fact that a broadcast signal reception failure occurred during recording, perform displaying at the display part of the interface unit 6 (step S10). Alternatively, if it is unnecessary to switch between the hierarchical layers, then pass over or "skip" the steps S11-S12. The processing above will be executed until the program playback is stopped. When stopped, terminate the processing (step S13).

Figure 7:
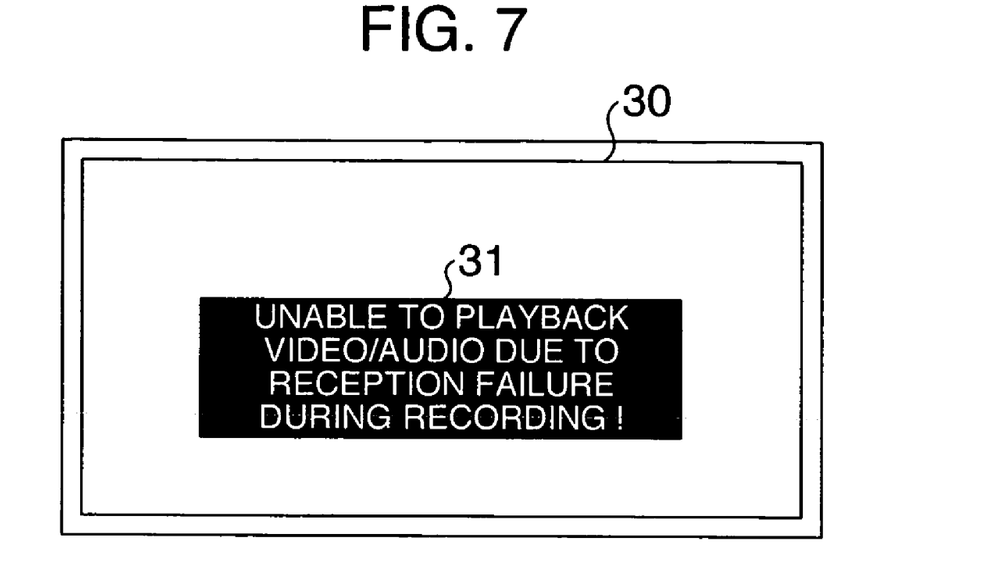
FIG. 7 is a diagram showing a practical on-screen display (OSD) screen when the reception quality is "2."

The above-noted display for notifying the user of the occurrence of a signal receiving failure during recording at the display unit of the interface unit 6 at the step S10 may be a visual indication such as shown in FIG. 7 for example. In FIG. 7, it is a pop-up window message 31 by means of an on-screen display (OSD) at the display unit 30 of the interface unit 6. Displaying the OSD message in this way helps the user avoid feeling uncomfortable.

In the above explanation, a plurality of transport packets to be output from the separator unit 4 to the writing unit 10 may be partial or all transport packets of the hierarchical service in case the illustrative device is receiving digital broadcast contents being hierarchically transmitted.

It should be noted that the transport packets to be recorded on the recording medium 11 are not exclusively limited to those separated by the tuner 1, transmission path demodulator 3 and separator 4 and may alternatively be those transport packets which are input from external equipment via an IEEE-1394 interface, wireless local area network (LAN) and the Internet or else, which are not depicted herein. In this case also, similar operations become possible by making a reception quality list at the time of signal reception.

Embodiment 2

Figure 8:
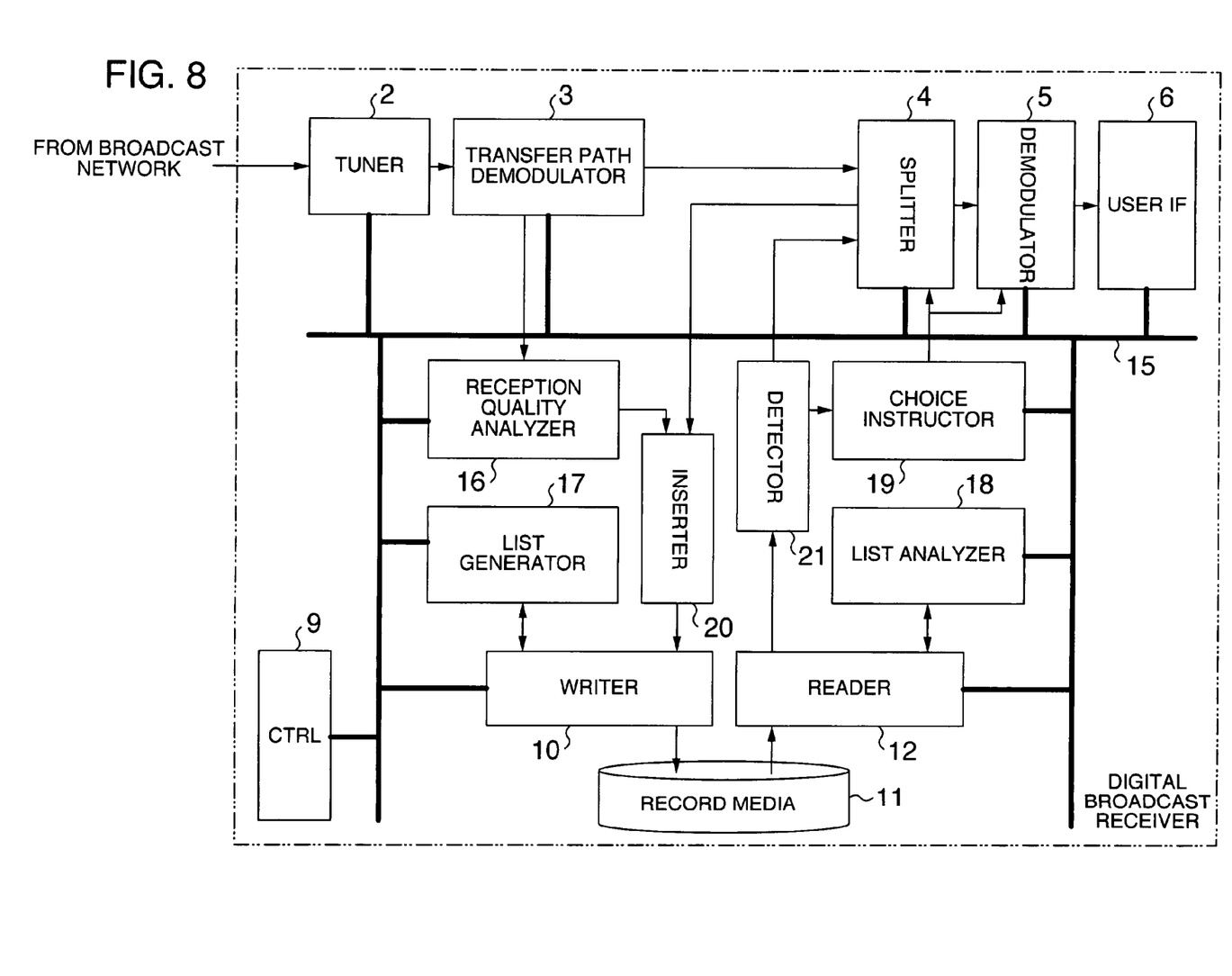
FIG. 8 is a block diagram showing a configuration of a storage device-embedded digital broadcast receiver device.

Turning to FIG. 8, there is shown in block diagram form an exemplary configuration of a digital broadcast receiver device with its built-in storage/output module in accordance with a second embodiment of this invention.

The configuration of this embodiment is similar in configuration to the first embodiment shown in FIG. 1 with an insertion unit 20 and a detection unit 21 being added thereto and also with replacement of a reception quality analyzer unit 16, list generation unit 7, list analyzer unit 18 and selection instruction unit 19. The other parts or components are the same as those shown in FIG. 1 both in structure and in operation, so their explanations will be eliminated while adding the same reference numerals to the same components. An explanation below will be related only to operations of the added or replaced components—i.e., insertion unit 20, detector 21, reception quality analyzer 16, list generator 17, list analyzer 18 and selection instruction unit 19.

The reception quality analyzer 16 judges the reception quality based on hierarchy number information from the transmission path demodulator 3 along with an electric field strength, C/N value, BER or error indicator information, and then outputs such information to the insertion unit 20.

The separator 4 separates from an input MPEG2-TS broadcast signal a plurality of transport packets of a channel that is designated via a user operation unit of the interface 6, such as a remote commander, and a control unit 9, and then outputs the selected plural transport packets toward the insertion unit 20.

The insertion unit 20 prepares, based the reception quality information from the reception quality analyzer 16, a transport packet (referred to hereinafter as "reception quality packet") containing therein a reception quality table, and inserts it into a transport packet that was separated at the separator 22 for output to a writing unit 10.

The writing unit 10 performs processing for recording on a recording medium 11 the transport packet in to which the reception quality packet from the insertion unit 20 was inserted and also outputs to the list generator unit 17 the information for preparation of the list at the recording medium 11. In addition, the writer 10 records on the record medium 11 a position information list that was generated by the list generator 17. The position information list may be the same as that explained in the embodiment 1 stated supra.

A readout unit 12 first reads the position information list out of the recording medium 11 and then outputs it to the list analyzer unit 18. The list analyzer 18 searches, based on the position information list, the record location of a desired transport packet and permits the readout unit 12 to sequentially read desired transport packets out of the recording medium 11 and then controls so that the read transport packets are output to the detector unit 21.

The detector 21 detects the reception quality packet from those transport packets coming from the readout unit 12 and analyzes the reception quality of the data being presently reproduced (i.e., data read out of the recording medium 11) and then outputs the resultant reception quality information to the selection instruction unit 19. The selection instruction unit 19 controls the separator 4 and/or the demodulator 5 based on the reception quality information from the list analyzer 18.

Additionally, the reception quality packet is creatable for example by forming a reception quality table in an adaptation field or a payload of a transport packet and using as its packet identifier (PID) a known unique value or a certain value (e.g., 0xiFFF) that is out of use during recording. When using the out-of-use value during recording for the PID, it is required to pre-record such the value as a one item of the position information list, by way of example. The detector 21 performs detection based on the PID of the reception quality packet.

Next, an explanation will be given of the reception quality packet insertion processing to be done by the insertion unit 20, while referring to a flowchart of FIG. 9. Upon startup of the recording of a digital broadcast program, the reception quality analyzer 16 acquires from the transmission path demodulator 3 the data indicative of a total hierarchy number of the hierarchical transmission (at step S14) along with an electric field strength, C/N value, BER and error indicator information (step S15). Thereafter, the reception quality analyzer 16 evaluates the reception quality from the electric field strength, C/N value, BER and error indicator information (step S16). For instance, in case the total hierarchy number is two and indicates the presence of two graded classes or layers consisting of a weak layer and a strong layer, the analyzer evaluates the reception quality as "0" when the reception quality is good and the electric field strength, C/N value, BER and error indicator information ensures the weak-layer signal receivability, such as in the state that a movable body remains stationary. Alternatively, the analyzer evaluates the reception quality as "1" when the movable body begins to move or when it remains stationary while the reception quality decreases due to a change in signal reception ambient environment resulting in the electric field strength, C/N value, BER and error indicator information permitting signal reception of the strong hierarchical layer. Further, evaluate the reception quality as "2" when the electric field strength, C/N value, BER and error indicator information indicate that any strong-layer signal receivability is lost completely, such as the inside of a tunnel or else. The insertion unit 20 prepares a reception quality packet based on a respective one of the reception quality information and the total hierarchy number information from the reception quality analyzer 16 (at step S17). Note that if no hierarchical transmission is available then the total hierarchy number information becomes "1." Further, the inserter 20 judges whether a plurality of separated transport packets coming from the separator 4 include a time period capable of inserting the reception quality packet (step S18). If such insertable time period is present, then insert the reception quality packet (step S20).

Alternatively if such insertable time period is absent then determine whether a packet-insertable time period is present within a certain time (e.g., 100 milliseconds) (at step S19). If no such insertable time is still absent even after the elapse of a given length of time, and then skip the step S20.

The processing above will be executed until the program playback is halted. When halted, let the processing be ended (at step S21).

An explanation will next be given of the reception quality packet detection processing to be performed by the detector 21 with reference to a flowchart of FIG. 10.

Prior to startup of this processing, the list analyzer 13 obtains from the readout unit 12 the position information list being recorded on the recording medium 11 while program playback gets started based on this list.

Upon startup of the program playback, the detector 12 acquires from the readout unit 12 the reception quality packet from among a plurality of transport packets being recorded on the recording medium 11 (at step S22). Based on the hierarchy number information of the reception quality packet, the detector 21 determines whether the reception quality is less than or equal to N−1 in case the total hierarchy number is N (at step S23). If the reception quality is less than or equal to N−1, then evaluate whether hierarchy switching is necessary or not from a presently reproduced hierarchical layer and the reception quality of the reception quality packet thus acquired (step S24). When the hierarchy switching is necessary, the selection instruction unit 14 controls the separator 4 and/or demodulator 5 and/or interface unit 6 in such a way as to perform hierarchy selection, playback and/or display (step S26).

On the other hand, in case the reception quality is N, this means that playback is impossible at every hierarchical layer. Thus, perform displaying at the display unit of the interface 6 for notifying the user of the fact that a signal receiving failure occurred during recording (at step S25).

Alternatively, if it is unnecessary to switch between the hierarchical layers then skip the step S26. The processing above will be executed until stoppage of the program playback. Upon stoppage, finish the processing (at step S27).

The above-noted displaying in order to notify the user of the occurrence of a signal receiving failure during recording at the display unit of the interface unit 6 at the step S25 is a display as shown in FIG. 7, for example. In FIG. 7, it is a pop-up message window 31 by means of an OSD display at the display unit 30 of the interface 6. Displaying such message prevents the user from having any uncomfortable feelings.

In the above explanation, a plurality of transport packets to be output from the separator 4 to the writing unit 10 may be partial or all transport packets of the hierarchical service in case the illustrative receiver device receives digital broadcast that is being hierarchically transmitted.

It must be noted that the transport packets to be recorded on the recording medium 11 are not exclusively limited to those separated by the tuner 1, transfer path demodulator 3 and separator 4 and may alternatively be transport packets which are input from external equipment via an IEEE-1394 interface, wireless LAN, the Internet or else, which are not depicted herein. In this case also, similar operations are achievable by preparing a reception quality list at the time of signal reception.

Figure 6:
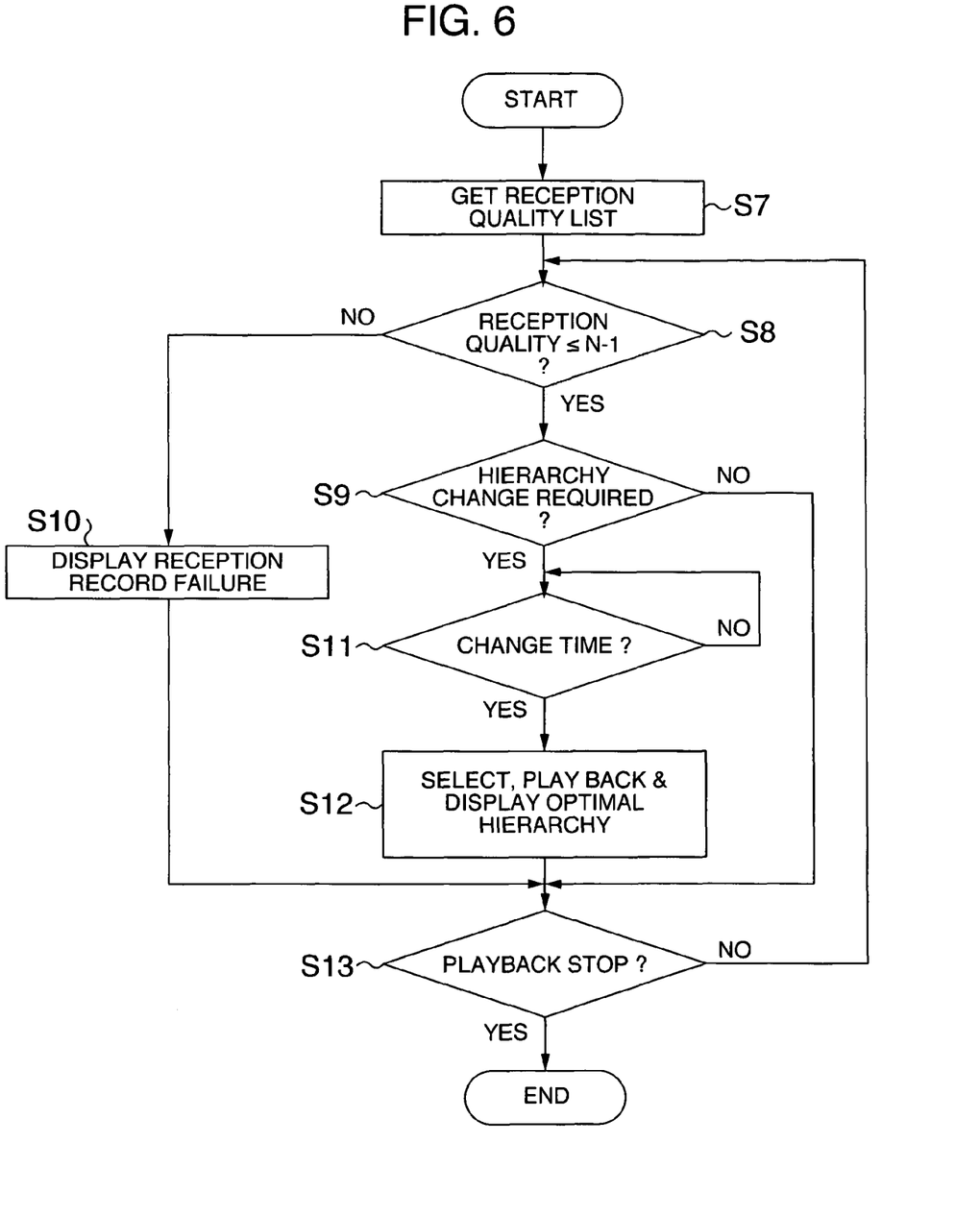
FIG. 6 is a flowchart showing reception quality analysis processing of a list analyzer unit 13.
Figure 10:
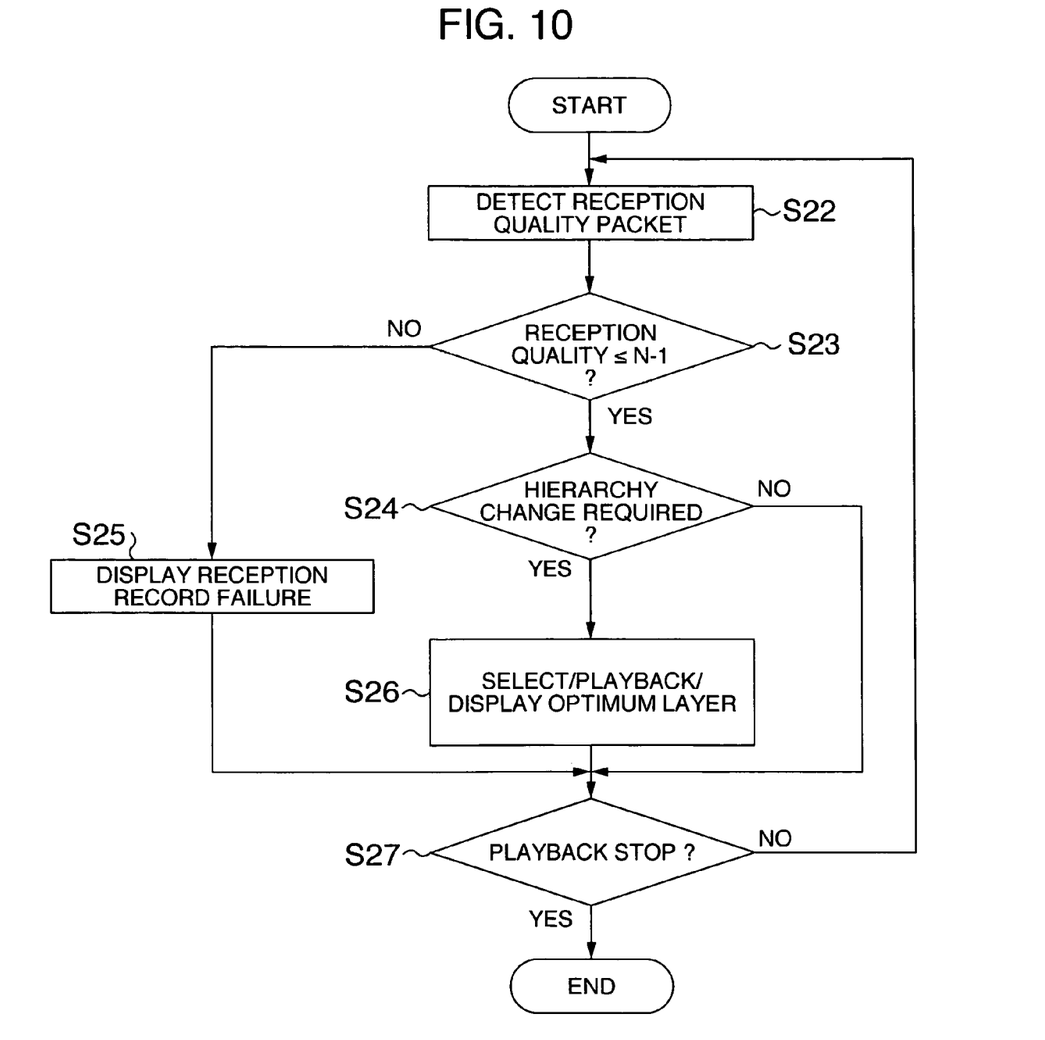
FIG. 10 is a flowchart showing reception quality packet detection processing to be done by a detector unit 21.
Figure 11:
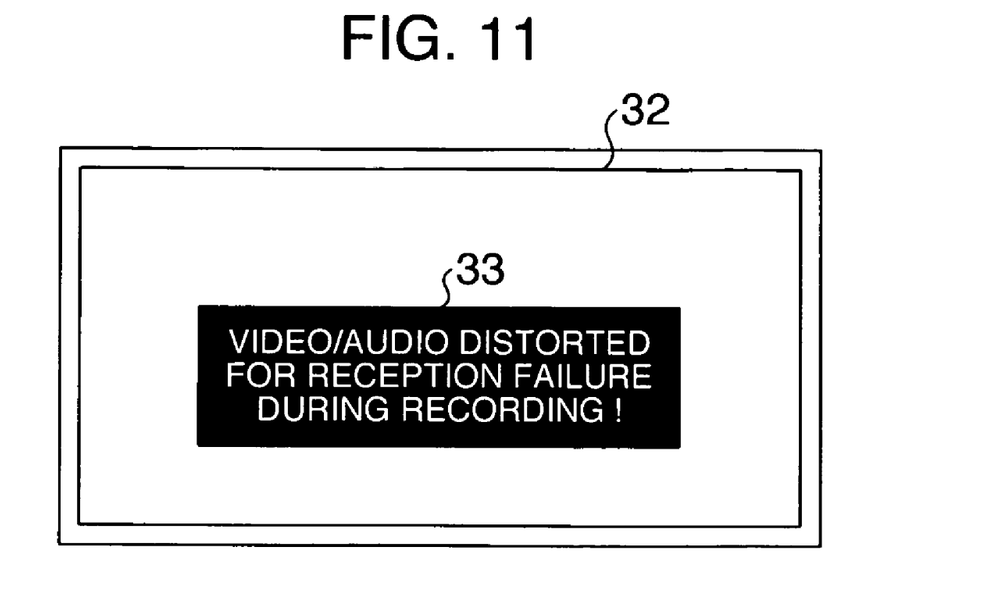
FIG. 11 is a diagram showing a practical OSD display screen when the reception quality is "2."

While the above-noted embodiments 1 and 2 have been explained while referring to the flowcharts of FIGS. 6 and 10 so that playback is impossible at every hierarchical layer in case an error is found in the strongest layer, no appreciable programs occur as to playback of the strongest hierarchical layer insofar as certain degrees of video/audio disturbances are allowed. In this case, it is recommendable to notify the user of the occurrence of a signal receiving failure at the display unit of interface 6 and the presence of a risk as to disturbance of reproduced video images and audio sounds. For example, a display such as shown in FIG. 11 is employable. In FIG. 11, it is a message 33 by means of OSD display on the display unit 32 of the interface 6. Displaying in this way makes it possible to lighten the annoyance with respect to the user even when video images or audio sounds become disordered during playback thereof.

Figure 5:
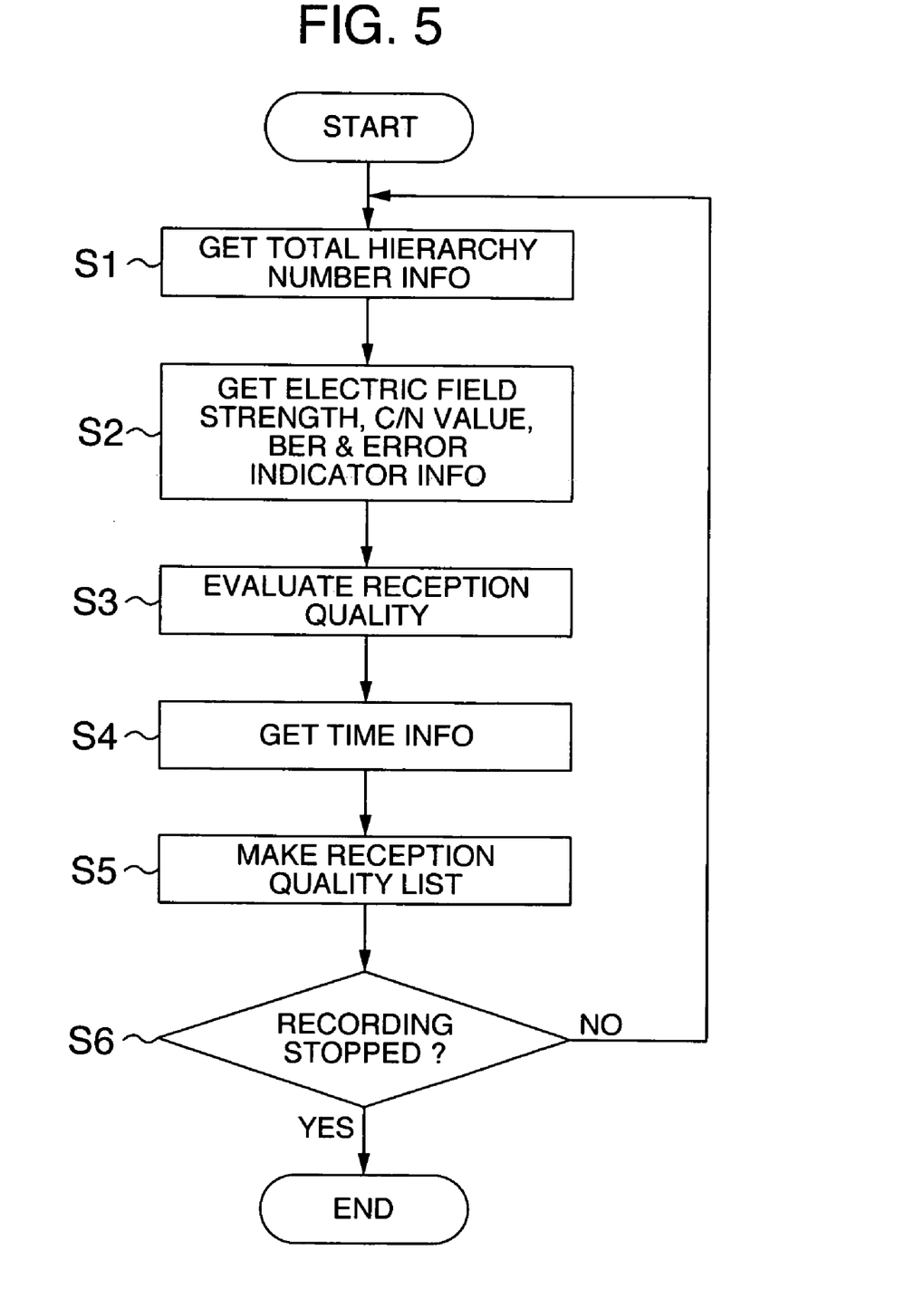
FIG. 5 is a flow chart showing reception quality makeup processing to be performed by a list generator unit 8.
Figure 9:
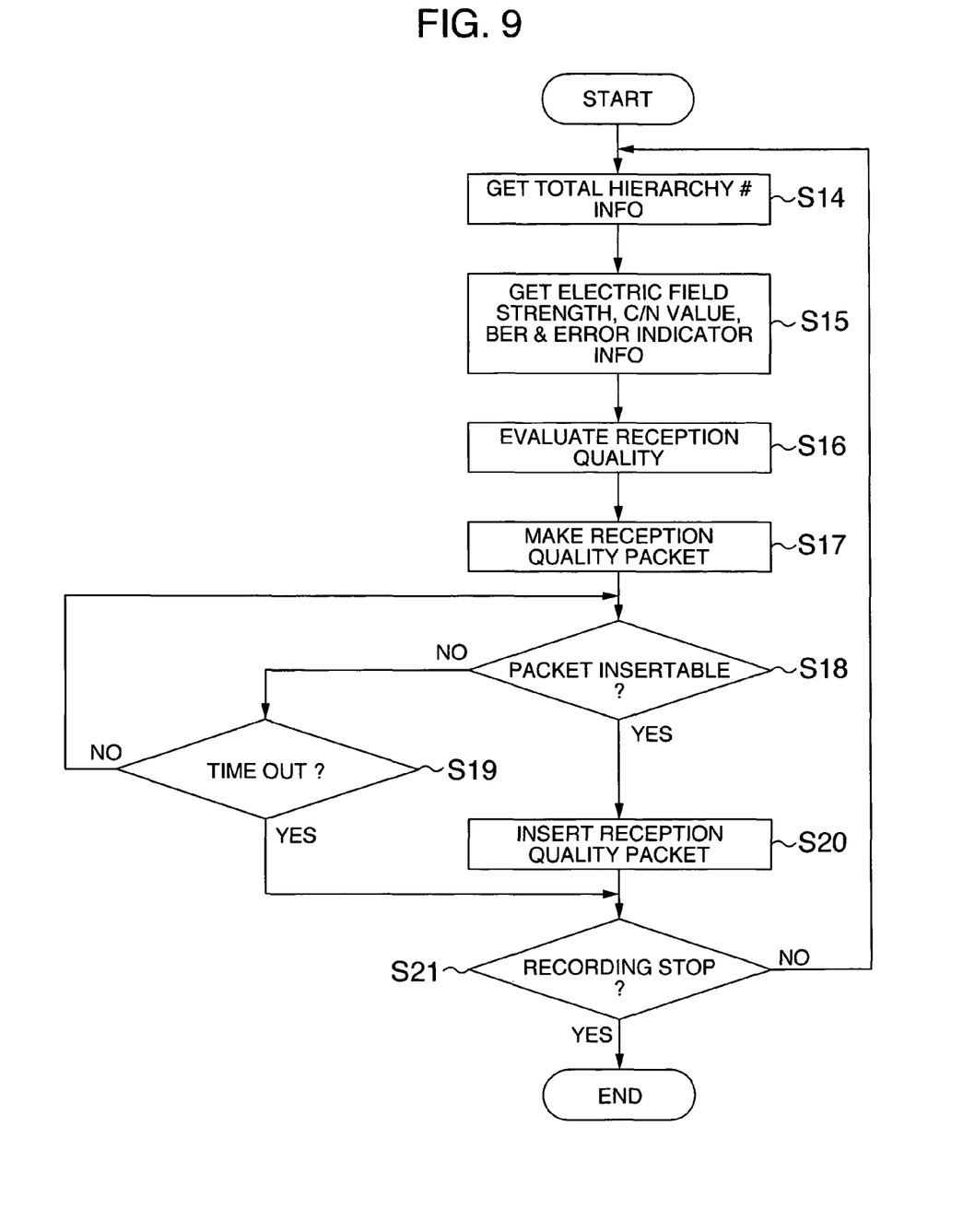
FIG. 9 is a flow chart showing reception quality packet insertion processing to be performed by an insertion unit 20.
Figure 12:
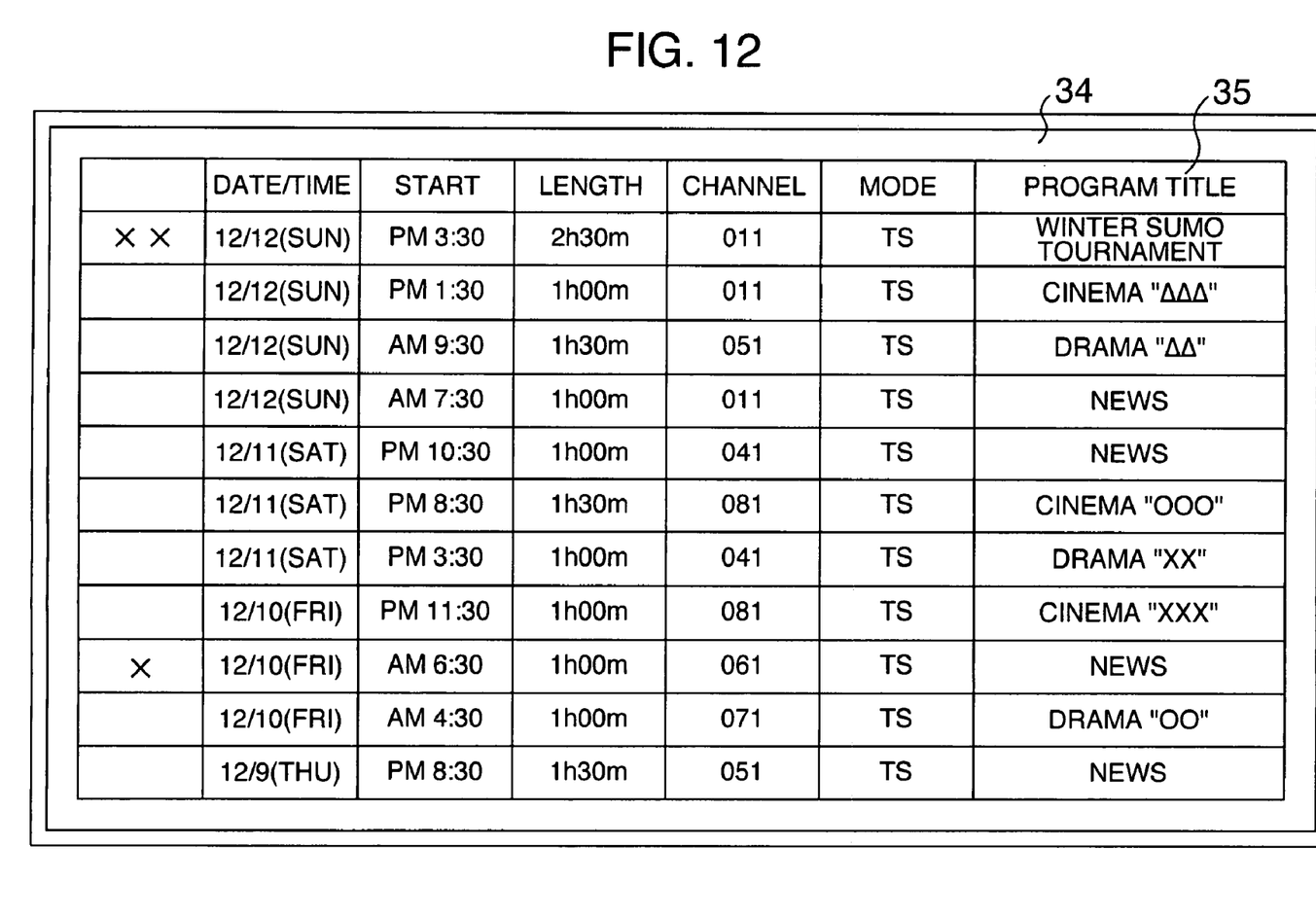
FIG. 12 is a diagram showing a practical OSD display screen upon adding of the reception quality to a recorded program list.

In addition, in the reception quality evaluation step in the explanation of the flowchart of FIG. 5 or 9, it is preferable in case the reception quality is other than the good condition ("0") to notify the user of such fact after completion of the recording. Generally, visual exhibition relating to a recorded program list for indicating the program content being recorded on recordable media is well known. More specifically, in such the record program list, detailed contents of the programs being recorded on the record media are described. Such contents may include, but not limited to, a recording date and time, record start time, program length, channel, recording mode, and program title. A practical example which displays the reception quality at the time of recording while letting it be correlated with these information items is shown in FIG. 12. In FIG. 12, it is a record program list 35 by means of an OSD display on the display unit 34 of the interface 6, while indicating them in a left side column in the forms of reception quality "0"=[ ], "1"=[x], and "2"=[xx]. For example, a program with an indication of "December 12 (Sun) PM 3:30 2 h 30 m 011 TS Winter Grand Sumo Tournament" means that the reception quality becomes "2" during recording. Additionally a program of "December 10 (Fri) AM 6:30 1 h 00 m 061 TS News" means that the reception quality becomes "1" during recording. Displaying in this way makes it possible to inform the user of the during-recording reception quality prior to playback of the program recorded. Thus it is possible to lighten the annoyance with respect to the user even where video images and audio sounds are distorted during playback.

It is noted that although in the embodiments 1-2 the explanation has been made while taking as an example the ISDB-T standards-implemented hierarchical transmission scheme of Japan, the techniques of the invention may be applicable to all of the ISDB-S of Japan, DVB-H in Europe, or any hierarchically transmittable digital broadcast standards in United States, China and other countries.

Also note that the above explained functions of the transmission path demodulator unit, separator unit, reception quality analyzer unit, list generator unit, list analyzer unit, selection instruction unit, insertion unit, control unit and others are realizable by software-based processing or alternatively configurable by hardware.

Although the embodiments and modified examples of the present invention have been explained above, these are mere examples for explanation of this invention and should not be interpreted to limit the scope of the invention only to these embodiments and modifications. The invention is implementable even in other various types of digital broadcast receiving devices.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A digital broadcast receiving device comprising:
reception means for receiving and demodulating a digital broadcast signal including a data stream transmitted by a first layer and a data stream transmitted by a second layer;
analysis means for analyzing reception quality of the digital broadcast signal received at said reception means;
record means for recording therein both the data stream transmitted by the first layer and the data stream transmitted by the second layer included in the digital broadcast signal received at said reception means; and
reproduction means for reproducing either the data stream transmitted by the first layer and recorded in the record means or the data stream transmitted by the second layer and recorded in the record means, wherein:
said record means is adapted to record therein information concerning the reception quality of the digital broadcast signal analyzed by said analysis means in recording the data streams of the first and second layers included in said digital broadcast signal such that said information concerning the reception quality of the digital broadcast signal is associated with the data streams of the first and second layers, and
said reproduction means is adapted to reproduce, based on the recorded information concerning the reception quality of the digital broadcast signal in said record means, either the data stream transmitted by the first layer and recorded in the record means or the data stream transmitted by the second layer and recorded in the record means.

2. The digital broadcast receiving device according to claim 1, wherein said information concerning the reception quality is packetized and inserted into the data stream transmitted by the first layer and the data stream transmitted by the second layer and then recorded in said record means.

3. The digital broadcast receiving device according to claim 1, wherein said information concerning the reception quality is formulated into a list with a plurality of information items bundled together and then recorded in said record means.

4. The digital broadcast receiving device according to claim 1, wherein said analysis means detects a hierarchy number being included in the received digital broadcast signal and wherein said reproduction means uses information as to said hierarchy number during reproduction of the data stream transmitted by the first layer or the data stream transmitted by the second layer to thereby reproduce the data stream of either hierarchical class.

5. The digital broadcast receiving device according to claim 1, wherein said analysis means analyzes the reception quality of said digital broadcast signal based on at least one of electric field strength, carrier-to-noise (C/N) value and bit error rate (BER) of the received digital broadcast signal.

6. The digital broadcast receiving device according to claim 1, further comprising:

notice means for notifying, when the reception quality analyzed at said analysis means fails to satisfy predetermined quality, a user of such the fact during reproduction.

7. A digital broadcast receiving method comprising the steps of:

receiving and demodulating a digital broadcast signal including a data stream transmitted by a first layer and a data stream transmitted by a second layer;

analyzing reception quality of the received digital broadcast signal;

recording to a recording medium both the data stream transmitted by the first layer and the data stream transmitted by the second layer contained in the received digital broadcast signal;

recording to the recording medium information concerning the analyzed reception quality of the digital broadcast signal in recording the data streams of the first and second layers included in said digital broadcast signal such that said information concerning the analyzed reception quality of the digital broadcast signal is associated with the data streams of the first and second layers;

managing the stored information concerning the reception quality of said digital broadcast signal, the data stream transmitted by the first layer and the data stream transmitted by the second layer in order to correlate said stored information with the data stream transmitted by the first layer and the data stream transmitted by the second layer; and reproducing either the data stream transmitted by the first layer or the data stream transmitted by the second layer based on the stored information concerning the analyzed reception quality of the digital broadcast signal.

8. A receiving device comprising:

reception means for receiving a digital broadcast including a data stream transmitted by a first layer and a data stream transmitted by a second layer;

record means for recording therein both the data stream transmitted by the first layer and the data stream transmitted by the second layer included in the digital broadcast received at said reception means; and reproduction means for reproducing either the data stream transmitted by the first layer and recorded in the record means or the data stream transmitted by the second layer and recorded in the record means, wherein:

said record means is adapted to record therein information of reception quality of the digital broadcast received at the reception means in recording the data streams of the first and second layers included in said digital broadcast such that said information of reception quality of the digital broadcast is associated with the data streams of the first and second layers, and said reproduction means is adapted to reproduce, based on information concerning the reception quality of the digital broadcast recorded in the record means, either the data stream transmitted by the first layer or the data stream transmitted by the second layer.

* * * * *